United States Patent

Tanabe et al.

[11] Patent Number: 5,948,712
[45] Date of Patent: Sep. 7, 1999

[54] FABRIC FOR TRIM BASE MEMBER

[75] Inventors: Kazuo Tanabe; Masahiro Kodama, both of Gifu; Takashi Koyama; Yoshihiro Honda, both of Aichi, all of Japan

[73] Assignee: Ikeda Bussan Co., Ltd., Ayase, Japan

[21] Appl. No.: 09/049,141

[22] Filed: Mar. 27, 1998

[30] Foreign Application Priority Data

Mar. 28, 1997 [JP] Japan .................................. 9-094639

[51] Int. Cl.⁶ .............................. B32B 27/02; B32B 5/28
[52] U.S. Cl. .......................... 442/411; 442/152; 442/153; 442/327; 442/369; 442/415
[58] Field of Search ..................... 442/152, 369, 442/153, 199, 311, 361, 164, 165, 170, 171, 327, 411, 415

[56] References Cited

U.S. PATENT DOCUMENTS

| 4,906,521 | 3/1990 | Turunen et al. | 442/411 |
| 5,458,962 | 10/1995 | Birch | 442/152 X |
| 5,709,925 | 1/1998 | Spengler et al. | 442/152 X |
| 5,783,505 | 7/1998 | Duckett et al. | 442/411 |

*Primary Examiner*—Daniel Zirker
*Attorney, Agent, or Firm*—Foley & Lardner

[57] ABSTRACT

The invention relates to a fabric used for preparing a base member of a trim member. This fabric is prepared by heating a mixture of a vegetable stiff fiber and a thermoplastic fiber. With this heating, the thermoplastic fiber becomes soft, and thus the vegetable stiff fiber and the thermoplastic fiber are united together. Examples of the vegetable stiff fiber are hemp fiber, coconut fiber and bamboo fiber. An example of the thermoplastic fiber is a composite fiber made of polyethylene and polypropylene. The fabric is superior in strength and workability and becomes advantageously low in heating temperature for molding the fabric.

16 Claims, No Drawings

FABRIC FOR TRIM BASE MEMBER

BACKGROUND OF THE INVENTION

The present invention relates to a fabric used for preparing a trim base member (i.e., a base member of a trim member) of automotive ceiling, door, rear parcel compartment and the like.

There is known a conventional trim base member containing glass fibers which are united together by means of phenol resin. In the production of this conventional trim base member, small splinters of glass fibers may scatter in the work place. Furthermore, this phenol resin may cause an offensive smell during the heating for molding the trim base member. Phenol resin has a hardening temperature of at least 180° C. Thus, it is necessary to use a large amount of heat energy during the heating for hardening phenol resin. Furthermore, it becomes difficult to mold this trim base member together with an outer skin member having a low heat resistance, due to high hardening temperature of phenol resin.

SUMMARY OF THE INVENTION

It is therefore an object of the present invention to provide a fabric used for preparing a base member of a trim member, which fabric can be prepared without making the working environment inferior and is superior in strength and workability and low in heating temperature for molding the fabric.

It is another object of the present invention to provide a trim member comprising a base member made of such fabric.

According to the present invention, there is provided a fabric used for preparing a base member of a trim member. This fabric is prepared by a method comprising the step of (a) heating a mixture of a vegetable stiff fiber and a thermoplastic fiber, such that said thermoplastic fiber becomes soft and thus said vegetable stiff fiber and said thermoplastic fiber are united together.

According to the present invention, there is provided a trim member comprising a base member made of the above-mentioned fabric.

The above-mentioned fabric according to the present invention can be prepared, without making the working environment inferior, due to the use of a vegetable stiff fiber and a thermoplastic fiber. Furthermore, this fabric becomes superior in strength and workability, due to that the vegetable stiff fiber and the thermoplastic fiber are united together by the softening of the thermoplastic fiber. The heating temperature for molding the fabric is low due to the use of a thermoplastic fiber. With this, it becomes possible to attach an outer skin member having a low heat resistance to the fabric upon molding of the fabric. An example of this outer skin member is a nonwoven fabric which is made of polypropylene fibers and lined with a polyethylene film. Still furthermore, the thermoplastic fiber contained in the discarded trim member can be recovered in the form of thermoplastic resin by softening or melting of the discarded trim member.

DESCRIPTION OF THE PREFERRED EMBODIMENTS

A fabric used for preparing a base member of a trim member will be described in detail in accordance with the present invention, as follows.

Examples of a vegetable stiff fiber suited to the invention are hemp fiber, coconut fiber, bamboo fiber, and the like. These fibers are stiff vegetable fibers. This vegetable stiff fiber does not make the working environment inferior, unlike conventional glass fibers. The vegetable stiff fiber may be a mixture of at least two different fibers.

Examples of a thermoplastic fiber suited to the invention are thermoplastic fibers which become soft by heating, such as polyethylene fiber, polypropylene fiber, side-by-side type polyethylene-polypropylene composite fiber, core-and-sheath type polyethylene-polypropylene composite fiber, polyamide fiber, polyvinylidene chloride fiber. A particularly preferable example of the thermoplastic fiber is one containing a polyethylene component and a polypropylene component, such as a mixture of polyethylene fiber and polypropylene fiber, polyethylene-polypropylene composite fiber, a mixture of polyethylene fiber and polyethylene-polypropylene composite fiber, and a mixture of polypropylene and polyethylene-polypropylene composite fiber. In the thermoplastic fiber, the weight ratio of the polyethylene component to the polypropylene component is preferably from 1:10 to 3:10.

The mixing ratio of the vegetable stiff fiber to the thermoplastic fiber by weight is preferably from 4:6 to 7:3. In the preparation of the fabric, a mixture of the vegetable stiff fiber and the thermoplastic fiber may be formed into a sheet of web or a sheet prepared by needle-punching to entangle these fibers. Then, this fibrous sheet is heated at a certain predetermined temperature, thereby to soften the thermoplastic fiber. With this, the vegetable stiff fiber and the thermoplastic fiber are united together by the softened thermoplastic fiber. This heating of the fibrous sheet may be conducted by applying a heated air to the fibrous sheet, while the fibrous sheet is placed on a wire netting or an iron plate or held at its peripheral portion. The thus obtained fabric may have a density of from about 900 to about 1,500 g/m$^2$ and a thickness of from about 7 to about 15 mm. The temperature of the above heating of the fabric is set to be not lower than the softening point of the thermoplastic fiber. In particular, when the thermoplastic fiber contains a polyethylene component and a polypropylene component, the heating temperature is set to be not lower than the softening point of the polyethylene component and not higher than the softening point of the polypropylene component. Due to this heating temperature, the polyethylene component becomes soft. With this, the vegetable stiff fiber and the thermoplastic fiber are united together. Thus, the obtained fabric becomes superior in strength. Furthermore, the constituent fibers of the fabric do not get loose, and the fabric improves in workability of the further processing thereof.

In view of the improvement of strength of the trim base member, it is preferable to use polyethylene-polypropylene composite fiber, more preferably a mixture of polypropylene fiber and polyethylene-polypropylene composite fiber, for the thermoplastic fiber of the fabric. Due to the use of this composite fiber or this mixture, the vegetable stiff fibers are well united together by means of the softened thermoplastic fiber. Furthermore, the obtained trim base member further improves in rigidity and stability to maintain the molded shape thereof. In the thermoplastic fiber, the weight ratio of the polypropylene fiber to the polyethylene-polypropylene composite fiber is preferably from 2:1 to 5:1. The polyethylene-polypropylene composite fiber may be of a side-by-side type or a core-and-sheath type. Of these types, it is preferable to use a core-and-sheath type polyethylene-polypropylene composite fiber having a core of polypropylene component and a sheath of polyethylene component. With this, the obtained trim base member still further improves in rigidity and stability to maintain the molded shape thereof, because the vegetable stiff fibers are well united together by means of the softened polyethylene component of the sheath even if the polyethylene component is used in a small amount. In other words, it becomes possible to decrease the amount of the polyethylene component, which makes the trim base member inferior in rigidity and stability to maintain the molded shape thereof, if the polyethylene component is used as a material of the sheath of the core-and-sheath type composite fiber. In the polyethylene-polypropylene composite fiber, the weight ratio of the polyethylene component to the polypropylene component is preferably from 1:2 to 2:1.

In the invention, the obtained fabric may be molded by hot pressing or cold pressing after heating of the fabric. The heating temperature for molding the fabric is set to be not lower than the softening point of the thermoplastic fiber. When the thermoplastic fiber contains a polyethylene component and a polypropylene component, this heating temperature is set to be not lower than the softening point of the polyethylene component, preferably not lower than the softening point of the polypropylene component. The fabric may be molded by cold pressing after heating of the fabric, using waste heat generated during the production of the fabric.

The following nonlimitative examples are illustrative of the present invention.

EXAMPLE 1

At first, a mixture of 60 parts by weight of hemp fibers, 30 parts by weight of polypropylene fibers and 10 parts by weight of polyethylene-polypropylene composite fibers was formed into a fibrous web sheet. The polyethylene-polypropylene composite fibers was core-and-sheath composite fibers having a core made of a polypropylene component and a sheath made of a polyethylene component. In the polyethylene-polypropylene composite fiber, the weight ratio of the polyethylene component to the polypropylene component was 5:5. Thus, in the thermoplastic fibers (i.e., a mixture of the polypropylene fibers and the polyethylene-polypropylene composite fibers), the weight ratio of the polyethylene component to the polypropylene component was 12.5:87.5.

The obtained fibrous sheet was cut to have certain predetermined dimensions. Then, this fibrous sheet was heated at 150° C. for 1 min, thereby to soften only the polyethylene component of the thermoplastic fibers and thus to unite the hemp fibers together by the softened polyethylene component. With this, there was obtained a trim base member's fabric having a density of 1,000 g/m$^2$ and a thickness of 10 mm. Then, the fabric was heated at 180° C. to soften the polyethylene component and the polypropylene component. Then, the heated fabric was molded by cold pressing into a certain predetermine shape, for example, of an automotive ceiling.

EXAMPLE 2

At first, a mixture of 60 parts by weight of bamboo fibers, 30 parts by weight of polypropylene fibers and 10 parts by weight of polyethylene fibers was formed into a fibrous web sheet. Then, this sheet was subjected to needle-punching. Then, the fibrous sheet was heated at 150° C. for 1 min to obtain a trim base member's fabric. This fabric was heated in the same manner as that of Example 1, thereby to mold the fabric into a certain predetermined shape.

What is claimed is:

1. A fabric used for preparing a base member of a trim member, said fabric being prepared by a method comprising the step of:

(a) heating a mixture of a vegetable stiff fiber and a thermoplastic fiber, such that said thermoplastic fiber becomes soft and thereby said vegetable stiff fiber and said thermoplastic fiber are fused together, wherein said thermoplastic fiber contains a polyethylene component and a polypropylene component, and wherein the step (a) is conducted at a first temperature which is not lower than a softening point of said polyethylene component and lower than a softening point of said polypropylene component, and wherein said thermoplastic fiber comprises a composite fiber of polyethylene and polypropylene.

2. A fabric according to claim 1, wherein said thermoplastic fiber further comprises a polypropylene fiber.

3. A fabric according to claim 1, wherein said composite fiber has a core made of a polypropylene component and a sheath that surrounds said core and is made of a polyethylene component.

4. A fabric according to claim 1, wherein said vegetable stiff fiber is selected from a hemp fiber, a coconut fiber, a bamboo fiber, and mixtures thereof.

5. A fabric according to claim 1, wherein a weight ratio of said polyethylene component to said polypropylene component is from 1:10 to 3:10.

6. A fabric according to claim 1, wherein a weight ratio of said vegetable stiff fiber to said thermoplastic fiber is from 4:6 to 7:3.

7. A fabric according claim 1, which has a weight of from 900 to 1,500 g per square meter of said fabric.

8. A fabric according claim 1, which has a thickness of from about 7 to about 15 mm.

9. A fabric according to claim 2, wherein a weight ratio of said polypropylene fiber to said composite fiber is from 2:1 to 5:1.

10. A fabric according to claim 3, wherein a weight ratio of said polyethylene component to said polypropylene component in said composite fiber is from 1:2 to 2:1.

11. A fabric according to claim 1, wherein said first temperature is about 150° C.

12. A fabric according to claim 1, wherein said fabric prepared by the step (a) is heated at a second temperature which is not lower than a softening point of said polyethylene component, to mold said fabric into a shape.

13. A fabric according to claim 12, wherein said second temperature is not lower than a softening point of said polypropylene component.

14. A fabric according to claim 13, wherein said second temperature is about 180° C.

15. A trim member comprising:

a base member made of a fabric prepared by a method comprising the step of:

(a) heating a mixture of a vegetable stiff fiber and a thermoplastic fiber, such that said thermoplastic fiber becomes soft and thereby said vegetable stiff fiber and said thermoplastic fiber are fused together, wherein said thermoplastic fiber contains a polyethylene component and a polypropylene component, and wherein the step (a) is conducted at a first temperature which is not lower than a softening point of said polyethylene component and lower than a softening point of said polypropylene component, and wherein said thermoplastic fiber comprises a composite fiber of polyethylene and polypropylene.

16. A method for preparing a fabric used for preparing a base member of a trim member, the method comprising the step of:

(a) heating a mixture of a vegetable stiff fiber and a thermoplastic fiber, such that said thermoplastic fiber becomes soft and thereby said vegetable stiff fiber and said thermoplastic fiber are fused together, wherein said thermoplastic fiber contains a polyethylene component and a polypropylene component, and wherein the step (a) is conducted at a first temperature which is not lower than a softening point of said polyethylene component and lower than a softening point of said polypropylene component, and wherein said thermoplastic fiber comprises a composite fiber of polyethylene and polypropylene.

* * * * *